United States Patent [19]

Shimizu et al.

[11] 4,113,892

[45] Sep. 12, 1978

[54] METHOD OF PROCESSING FERMENTED SOYBEANS AND FOOD PRODUCTS PREPARED THEREFROM

[75] Inventors: Junichi Shimizu; Takashi Hara; Tatsuya Iwakura; Yoshiro Itaya, all of Tokyo, Japan

[73] Assignee: Otsuka Kagaku Yakuhin Kabushiki Kaisha, Osaka, Japan

[21] Appl. No.: 717,322

[22] Filed: Aug. 24, 1976

[30] Foreign Application Priority Data

Aug. 28, 1975 [JP] Japan ............................ 50-103492
Aug. 28, 1975 [JP] Japan ............................ 50-103493
Mar. 19, 1976 [JP] Japan ............................ 51-29223
Apr. 12, 1976 [JP] Japan ............................ 51-40233
Jul. 7, 1976 [JP] Japan ............................ 51-79824

[51] Int. Cl.$^2$ .................. A23D 5/00; A21D 13/08; A23L 1/20; A23L 1/168
[52] U.S. Cl. .................. 426/602; 426/618; 426/634; 426/658; 426/385; 426/482; 426/551; 426/46
[58] Field of Search ............... 426/46, 605, 618, 634, 426/385, 482, 331, 44, 49, 52, 384, 552, 558, 602, 658, 551

[56] References Cited

U.S. PATENT DOCUMENTS

3,718,479  2/1973  Kanno et al. .................... 426/46
3,881,033  4/1975  Steele ............................. 426/385

*Primary Examiner*—Joseph M. Golian
*Assistant Examiner*—R. A. Yoncoskie
*Attorney, Agent, or Firm*—Armstrong, Nikaido, Marmelstein & Kubovcik

[57] ABSTRACT

A method of processing fermented soybeans by freeze-drying the fermented soybeans in a vacuum and separating the dried soybeans into an outer layer portion and an inner layer portion, and a method of preparing instant fermented soybeans or instant rice containing fermented soybeans by contacting the inner layer portion with water with or without precooked rice for reconstitution and adding a powder of the outer layer portion to the reconstituted mass.

24 Claims, No Drawings

METHOD OF PROCESSING FERMENTED SOYBEANS AND FOOD PRODUCTS PREPARED THEREFROM

This invention relates to a method of processing fermented soybeans and food products prepared therefrom.

Because of the inherent nature of fermented foodstuffs, fermented soybeans are not adapted for preservation. To remedy this drawback, it has been practiced to dry fermented soybeans for example by a usual hot-air drying method. However, this method seriously impairs the taste and flavor of fermented soybeans, further making it impossible to restore the cobwebbing nature and unique feel of fermented soybeans even when water is added to dried fermented soybeans for reconstitution. The term "cobwebbing nature" referred to the nature of fermented soybeans that when fermented soybeans are separated from each other, the viscous substance covering the soybeans extends between the separated soybeans in the form of a cobwebb-like thread. As another drying method, vacuum freeze-drying method is also known. The dried fermented soybeans obtained by this method also entail the almost same drawbacks as above when reconstituted with water.

An object of this invention is to provide instant soybeans which are well adapted for preservation and a method of preparing the same.

Another object of this invention is to provide instant fermented soybeans which are almost comparable to fresh fermented soybeans in taste, flavor, feel and cobwebbing nature and a method of preparing the same.

Another object of this invention is to provide a method of preparing novel food products and food additives from fermented soybeans and to provide such food products and food additives.

Other objects of this invention will become apparent from the following description.

We have carried out research on the known methods of drying fermented soybeans and found that the conventional drawbacks can be overcome by a method comprising freeze-drying fermented soybeans in a vacuum, separating the dried soybeans into an outer layer portion and an inner layer portion, reconstituting only the inner layer portion with water and adding a powder of the outer layer portion to the reconstituted inner layer portion. We have also found that the outer layer portion and the inner layer portion are each singly useful as food products and food additives. We have further found that a mixture prepared by freeze-drying fermented soybeans in a vacuum and kneading the dried soybeans with water and sugar and/or sugar alcohol is useful as a novel food product resembling rice cake in elasticity and retaining the taste and flavor of fermented soybeans. We have further found that when a liquid seasoning is added to fermented soybeans prior to vacuum freeze-drying, the vacuum freeze-drying operation can be carried out with extreme ease, that the dried fermented soybeans can be readily reconstituted within a shorter period of time and that the reconstituted soybeans have a unique taste. This invention has been accomplished based on these novel findings.

More specifically, this invention provides: (1) a method of producing fermented soybeans characterized by freeze-drying the fermented soybeans in a vacuum and separating the dried soybeans into an outer layer portion and an inner layer portion, (2) a method of preparing instant fermented soybeans characterized by reconstituting the inner layer portion by contact with water and uniformly admixing a powder of the outer layer portion with the reconstituted portion, (3) a method of preparing instant rice containing fermented soybeans which comprises the above-mentioned method of preparing instant fermented soybeans and in which the inner layer portion is reconstituted conjointly with precooked rice, and (4) a method of preparing a food product substantially having the elasticity of rice cake characterized by freeze-drying fermented soybeans in a vacuum and kneading the dried soybeans with water and at least one of sugar and sugar alcohol.

The term "fermented soybeans" as used in this invention refers to a fermented food product prepared by fermenting steamed soybeans with *Bacillus Natto* and maturing the fermented soybeans.

According to this invention fermented soybeans are freeze-dried in a vacuum and the dried soybeans are separated into an outer layer portion and an inner layer portion. For this purpose usual fermented soybeans are usable. Fermented soybeans may be produced by any known method. Typically fermented soybeans are produced by fermenting steamed soybeans as wrapped with rice straw or wood shavings. When rice straw is used, steamed soybeans are wrapped with rice straw and fermented with *Bacillus Natto* on the straw. When wood shavings are used, steamed soybeans are inoculated with *Bacillus Natto*, then wrapped in a triangular shape with wood shavings wetted with warm water and fermented at about 40° to about 45° C. for about 12 to about 16 hours. The fermented soybeans can be effectively freeze-dried in a vacuum by known methods. For example, any of various vacuum freeze-drying apparatus may be used in usual manner. The vacuum is about 0.085 to about 0.095 Torr, preferably about 0.09 Torr. The drying temperature is about 40 to about 50° C., and the freezing temperature is about −10° to about −40° C.

The freeze-dried fermented soybeans are then separated into an outer layer portion and an inner layer portion. The term "outer layer portion" refers to the skin of the fermented soybean and viscous covering over the skin. The term "inner layer portion" refers to the remaining portion of the fermented soybean other than the outer layer portion. The fermented soybeans may be separated by any means insofar as they are separable into the outer layer portion and the inner layer portion. Examples of preferable means are a vibrating sieve and a gas-fluid separator. The most preferable vibrating sieve is ASTM-No. 6. The dried fermented soybeans are placed on the sieve and shaken, whereby the soybeans can be readily separated into the outer layer portion passing through the sieve and the inner layer portion remaining on the sieve.

The outer layer portion thus obtained has about ¼ the total weight of the dry fermented soybeans, contains large amounts of *Bacillus Natto* and the product thereof and therefore provides food products and food additives having high nutritious and medicinal effects. More specifically, because of the high contents of *Bacillus Natto* and of the product thereof, this portion has high enzymatic and digestive activities due to the presence of protease, amylase, cellulase, lipase, etc. The outer layer portion is further rich in vitamins derived from the product of *Bacillus Natto*. The outer layer portion has another feature that when stirred with addition of water, the portion exhibits a more marked cobwebbing nature than fresh fermented soybeans. The outer layer portion may be utilized variously. When finely divided, the portion is usable as a sprinkling powder for food and also as an additive for various food products. When sprinkled on roast fish or beefsteak, the powder removes the smell of the fish or beef and gives a unique flavor. Further when used as a food additive for stew or the like, the power increases the taste and nutrition of the food and also serves to adjust the viscosity of stew due to the outstanding cobwebbing nature thereof.

The inner layer portion obtained by the method of this invention has about ¾ the weight of the dry fermented soybeans and is comparable to fresh fermented soybeans in taste and flavor. Being separated from the outer layer portion, the inner layer portion is easy to digest. It is rich in proteins, has a high nutritious value and is therefore usable as an additive for various foods.

The inner layer portion has the most distinct feature that when contacted with water, preferably with hot water, the portion is restored to the inner layer portion of the original fresh fermented soybeans. When a powder of the outer layer portion is added to the reconstituted inner layer portion, instant fermented soybeans are available which are almost comparable to fresh fermented soybeans. The water to be used for reconstitution may be at room temperature, but use of hot water accelerates the reconstitution. Thus the water may preferably have a temperature of 40° to 100° C., more preferably 60° to 90° C. The inner layer portion may be contacted with water in any manner insofar as it is brought into full contact with water. Preferably the inner layer portion and excess hot water are mixed together. The contact time, which is suitable determined depending on the temperature and amount of hot water, is such as is needed for the reconstitution of the inner layer portion. It is not desirable to contact the portion with water for too long a time, because it will then become too soft. When the inner layer portion and hot water are mixed together, the contact time is usually about 10 seconds. For the reconstitution of the inner layer portion with hot water, it is also practiced to add excess water to the inner layer portion placed in a cup, leave the mixture to stand for about 10 seconds, remove the water from the cup, turn the cup upside down with the inner layer portion contained therein and allow the contents to settle for several minutes.

The separated outer layer portion is comminuted to particle sizes of up to 500 μ before being added to the inner layer portion. Any of various means is usable for the comminution. The power of the outer layer portion may be added as it is to the inner layer portion. Alternatively it is added as dissolved in water or soy sauce.

The present invention has the noteworthy feature to be described below. When fermented soybeans freeze-dried in a vacuum are reconstituted with hot water without being separated into outer and inner layer portions, the reconstitution of the dry soybeans takes a longer time and, moreover, the viscous substance covering the fermented soybeans is decomposed with the hot water, consequently reducing the cobwebbing nature of fermented soybeans. As a result, it is difficult to obtain a satisfactory product, since the nature of the reconstituted soybeans greatly differs from that of fresh fermented soybeans. In contrast, when the inner layer portion of dry fermented soybeans as separated from the outer layer portion is reconstituted with hot water and thereafter admixed with the outer layer portion according to this invention, the viscous substance remains free of decomposition, with the result that the product retains the original cobwebbing nature and is comparable to fresh fermented soybeans in quality and taste. The invention is further advantageous in that the inner layer portion separated from the outer layer portion can be reconstituted with hot water more rapidly than dry fermented soybeans which are not divided into outer and inner layer portions.

According to this invention, a powder of extract of Laminariales of Thaeothyte (hereinafter referred to as "seaweed") prepared by extracting seaweed with water at a temperature of at least 60° C. and subjecting the extract to vacuum freeze-drying is usable in place of, or conjointly with, the powder of the outer layer portion to be added to the reconstituted inner layer portion. For this purpose various seaweeds are usable such as Eiklonia, Eisenia, Undaria, Laminaria, *Eesenea arborea*, etc. Such seaweed is used in a raw state or as dried by sunlight. For extraction, the seaweed is immersed in warm water at a temperature of up to 60° C., more preferably 50° to 30° C. If the temperature of the water is higher than 60° C., or the water is vigorously stirred during extraction or contains a large amount of iron rust, the resulting food additive will have reduced viscosity and poor cobwebbing nature, hence objectionable. The liquid extract obtained is freeze-dried in a vacuum in usual manner within 24 hours after extraction. As is the case with the vacuum freeze-drying of fermented soybeans, various means are effectively usable for the freeze-drying of the extract under substantially the same conditions.

The dry powder obtained from the liqiud extract of seaweed contains polysaccharides apparently as distinct from the alginic acid obtained from the seaweed. When stored free of moisture, it is preservable for more than one year, such that it is thereafter readily soluble in cold or warm water, immediately exhibiting marked viscosity and cobwebbing nature. The powder contains about 0.5% of iodine which is much greater than in any other foods. Thyroid hormone is prepared from iodine. It is said that the adult requires usually 0.15 to 0.30 mg/day of iodine. Generally 0.01 to 0.02% of iodine is added to salt (NaCl) for the prevention and treatment of diseases. From this viewpoint, the dry powder of seaweed apparently has an advantageous nutritious effect.

When the freeze-dried extract of seaweed is used, it is used in an amount of about 0.5 to about 30 parts by weight, preferably about 1 to about 10 parts by weight, per 100 parts by weight of the dry powder of the inner layer portion.

Our research has revealed that instant rice containing fermented soybeans can be prepared with use of the inner layer portion and the outer layer portion. More specifically such instant rice can be readily prepared by freeze-drying fermented soybeans in a vacuum, separating the dried soybeans into an outer layer portion and an inner layer portion, adding precooked rice to the inner layer portion, reconstituting the mixture with water and adding a powder of the outer layer portion to the resulting mixture. The precooked rice to be used for this purpose may be prepared by any of known methods. For example, it is prepared by thoroughly immersing rice in dilute acetic acid and thereafter heating the rice at a temperature of at least 100° C. along with a suitable amount of water, or by preheating the immersed rice and passing the preheated rice through boiling water without allowing the rice to cool, or by cooking rice and rapidly removing water therefrom to a water content of about 5% at 80° to 130° C. at atmospheric or reduced pressure without lowering the temperature of the cooked rice. The precooked rice thus prepared can be reconstituted to the state of freshly cooked rice simply by adding an amount of water equal to that of the rice or 1.5 times the weight of the rice. Also usable is the precooked rice produced by vacuum freeze-drying method, or by steaming rice at high pressure, expanding the rice in an inflating device and drying the expanded rice. The proportions of the precooked rice and the inner layer portion are 60 to 80% by weight and 40 to 20% by weight. The mixture of the precooked rice and the inner layer portion may be reconstituted with water under the same conditions as when the inner layer portion is reconstituted as already described. The same powder of the outer layer portion as already described is added to the reconstituted mixture. If fermented soybeans freeze-dried in a vacuum are added to the precooked rice without being separated into outer and inner layer portions and the mixture is then reconstituted with water to obtain instant rice containing fermented soybeans, the reconstitution of the dried soybeans takes a longer time and, moreover, when hot water is used as the water, the viscous substance covering the fermented soybeans is decomposed with the hot water, consequently reducing the cobwebbing nature of fermented soybeans. As a result, it is difficult to obtain a satisfactory product. However, the inner layer portion separated from the outer layer portion according to this invention can be reconstituted with water more rapidly than the dried fermented soybeans which are not so separated. Accordingly, when hot water is added to the mixture of precooked rice and the inner layer portion of fermented soybeans as contemplated by this invention, the precooked rice and the inner layer portion can be reconstituted similarly, giving a satisfactory mixture of rice and fermented soybeans. When the outer layer portion is thereafter added to the reconstituted mixture, the viscous substance remains free of decomposition, so that the reconstituted soybeans restore the original cobwebbing nature and the properties of fresh fermented soybeans, affording a good taste.

According to this invention, a liquid seasoning can be added to fermented soybeans before the soybeans are subjected to vacuum freeze-drying operation, in the processing method wherein soybeans are freeze-dried in a vacuum and thereafter separated into an outer layer portion and an inner layer portion, in the method of preparing instant fermented soybeans from the separated outer layer portion and inner layer portion, and in the method of preparing instant rice containing fermented soybeans. Whereas fermented soybeans per se are tacky and are therefore difficult to spread out for vacuum freeze-drying, use of the liquid seasoning greatly facilitates the freeze-drying operation, since the liquid seasoning renders the soybeans flowable and spreadable and accordingly more amenable to the freeze-drying operation. Further when fermented soybeans are subjected to vacuum freeze-dyring after the liquid seasoning has been admixed therewith, the fermented soybeans, when dried, become porous due to the presence of water penetrating into the soybeans. Consequently the dried soybeans are made more restorable to the original state. In addition, the water contained in the fermented soybeans advantageously reduces separation of the viscous portion during vacuum freeze-drying. Use of the liquid seasoning is further advantageous in providing seasoned dry fermented soybeans with an enhanced taste. For example soy sauce, when used as the liquid seasoning, imparts its taste to the fermented soybeans and also conditions the flavor of the product during the freeze-drying step by being mixed with the soybeans, permitting the flavor of the soy sauce to overcome the disagreeable smell of the fermented soybeans. During dehydration in the course of freeze-drying, alcohols and the like contained in the soy sauce react with organic acids and the like which are supposedly responsible for the disagreeable smell, thus eliminating the smell. Presumably these effects greatly enhance the flavor and taste of the soybeans.

Useful liquid seasonings include those containing salt (NaCl) and water. The amount of the water is about 3 to about 20% by weight, and the amount of the salt is about 0.5 to about 5.0% by weight, based on the fermented soybeans. Lesser amounts of water and salt are not desirable for the drying operation, since fermented soybeans will then be tacky and reconstitution of the dry inner layer portion with water requires an increased period of time. Furthermore, the soybeans will not be fully impregnated with the liquid seasoning and will become less tasty. With excess water and salt present, the resulting product becomes hygroscopic and has reduced taste and flavor. Preferable examples of liquid seasonings are soy sauce, an aqueous solution of miso containing a small amount of sodium glutamate, an aqueous solution of salt containing sodium glutamate and a mixture of at least two of these examples. These liquid seasonings may further contain various spices. According to this invention, the seasoning must be liquid, whereby various advantageous effects described above are attainable. The liquid seasoning must be added to fermented soybeans prior to the vacuum freeze-drying operation. Otherwise, it is difficult to obtain a dry product which is uniformly seasoned. Furthermore, it would then be difficult to mature the taste and flavor during the freeze-drying operation, and water would not penetrate into the soybeans to produce the aforesaid advantageous result. In the case where the liquid seasoning is used, fresh fermented soybeans may be used as they are or as they are crushed.

We have further succeeded in producing a food product substantially having the elasticity of rice cake from fermented soybeans freeze-dried in a vacuum. More specifically we have found that such food product can be prepared by freeze-drying fermented soybeans in a vacuum, comminuting the dried soybeans without separation and admixing the resulting powder with water and sugar and/or sugar alcohol, the product no longer having the cobwebbing nature of fermented soybeans and resembling rice cake as distinct from usual pastes or creams.

Our research has revealed that the fermented soybean material must be freeze-dried in a vacuum and that it is impossible to obtain a product substantially having the elasticity of rice cake directly from fresh fermented soybeans or from fermented soybeans dried by a method other than the vacuum freeze-drying method. The fermented soybeans freeze-dried in a vacuum are then comminuted to particle sizes of up to 500$\mu$. The soybeans may be comminuted by any means. The resulting powder is admixed with sugar and/or sugar alcohol and water. A wide variety of sugars and sugar alcohols are usable, among which those having a water-solubility of at least 60% are preferable. Examples of such sugars are fruit sugar, sucrose, invert sugar, etc. and examples of sugar alcohols are sorbitol, xylitol, etc. Fruit sugar is especially preferable to use. The proportions of these ingredients are about 26 to about 72% by weight of at least one of sugars and sugar alcohols, about 9 to about 47% by weight of water and about 12 to about 63% by weight of the dry soybean powder. It is preferable to slightly vary the proportions depending on the kind of sugar or sugar alcohol. When fruit sugar, sorbitol, invert sugar and sucrose are used as the sugar and sugar alcohol, the proportions of the ingredients are as listed below.

|  | (% by weight) | | |
| --- | --- | --- | --- |
|  | Dry fermented soybean powder | Water | Sugar or sugar alcohol |
| Fruit sugar | 12 – 63 | 9 – 47 | 26 – 72 |
| Sorbitol | 17 – 63 | 10 – 47 | 27 – 61 |
| Invert sugar | 14 – 56 | 12 – 43 | 32 – 63 |
| Sucrose | 20 – 56 | 13 – 42 | 31 – 56 |

The food product thus prepared and substantially having the elasticity of rice cake no longer retains the inherent brown color of fermented soybeans but has a beige to white color. The product gives an agreeable feel similar to that of rice cake when eaten, has the nutritious value of fermented soybeans because of its enzymatic activity and high protein content and is readily digestible because carbohydrate in which fermented soybeans are deficient is added thereto. Thus the product is useful as a foodstuff and also as a material therefor. It is well adapted for preservation since the product does not immediately undergo fermentation unlike fresh fermented soybeans.

This invention will be described below with reference to Examples, in which the parts and percentages are all by weight.

EXAMPLE 1

A 1.033 g quantity of commercial fermented soybeans are pre-freezed in a freezer at −30° C. for 12 hours and subsequently freeze-dried in a vacuum freeze-drier (Model RL-50VS, product of Kyowa Vacuum Co., Ltd., Japan) in a vacuum of 0.09 Torr at 40° C. for 8 hours to obtain 422 g of dry fermented soybeans. The dry soybeans are screened by a sieve (ASTM-No. 6) to give 317 g of an inner layer portion as the plus material and 105 g of an outer layer portion as the minus material.

EXAMPLE 2

To salad dressing composed of 60 g of vinegar, 150 g of salad oil and 5 g of salt (NaCl) is added a powder of the outer layer portion obtained in Example 1 in a proportion of 2% based on the salad dressing, the mixture is thoroughly stirred and the settled matter is removed. The resulting salad dressing has a unique flavor and agreeable taste with the pungent odor of vinegar greatly reduced. Even when left to stand for more than 3 weeks, the salad dressing does not separate into an aqueous layer and an oil layer. Further when sprinkled on vegetable, the dressing remains well on the vegetable due to the viscosity imparted by the fermented soybean ingredient.

EXAMPLE 3

To 43% of wheat flour, 1% of baking powder, 8% of butter, 16% of sugar, 11% of egg and 6% of milk is added 15% of the inner layer portion obtained in Example 1, and the ingredients are fully mixed together. The mixture is shaped in the form of crackers and then baked at 150° C. for 15 minutes to obtain crackers. When fractured, the cracker is found to have no cobwebbing nature whatever. The cracker has unique flavor and taste. The cracker contains 11% of proteins. For comparison, fermented soybeans are freeze-dried in a vacuum in the same manner as in Example 1 and thereafter comminuted without being separated into an outer layer portion and an inner layer portion. The resulting powder is used in place of the powder of the inner layer portion to prepare crackers. When fractured, the cracker is found to have cobwebbing nature and is not a desirable product.

EXAMPLE 4

Wheat flour (84%), one % of salt (NaCl) and 15% of the inner layer portion obtained in Example 1 are thoroughly mixed together, and the mixture is shaped to a suitable size and then fried in salad oil at 150° C. for about 4 minutes. The resulting product has no smell of fermented soybeans, tastes like potatoes and contains 12.7% of proteins.

EXAMPLE 5

A 23 g quantity of the inner layer portion obtained in Example 1 is placed in a 150-ml paper cup measuring 6 cm in the diameter of its upper portion, 4 cm in the diameter of its lower portion and 7.5 cm in height. A plastic intermediate lid formed with eight apertures about 3 cm in diameter is fixedly placed in the cup 2.5 cm below its top end. Hot water is slowly poured into the cup up to a level 0.5 cm below its top end, and a top lid is fitted over the cup. Thirty seconds thereafter, the top lid is removed, the water is discarded, and the cup is closed again with the top lid, turned upside down and left to stand for 5 minutes. Subsequently the cup is returned to its original position, and the intermediate lid is then removed. A 3 g quantity of the outer layer portion obtained in Example 1, 7 g of soy sauce and 13 g of water are placed into the cup, and the contents are thoroughly mixed together to prepare instant fermented soybeans, which are found to have good cobwebbing nature and almost the same flavor and taste as fresh fermented soybeans.

EXAMPLE 6

Instant fermented soybeans are prepared in the same manner as in Example 5 except that in place of 3 g of the outer layer portion a mixture of 2 g of the outer layer portion and 0.5 g of powder prepared by extracting Ecklonia with water and freeze-drying the resulting extract in a vacuum. The instant fermented soybeans obtained are tasty, have good cobwebbing nature and are almost free of the disagreeable odor of fresh fermented soybeans. The powdery extract of Ecklonia used above is prepared by the following method. Ecklonia, dried by sunlight, is cut into square pieces, 1 cm by 1 cm, immersed in warm water in an amount of 10 times the weight of the seaweed and allowed to stand at 40° C. for 60 minutes for extraction. The seaweed is then squeezed, and the resulting liquid is filtered to obtain an extract in an amount of 6.3 times the weight of the dried seaweed. The extract is frozen at −30° C. and thereafter dried in the same vacuum freeze-drier as used in Example 1 for 6 hours. The dry product is comminuted.

EXAMPLE 7

A 23 g quantity of the inner layer portion obtained in Example 1 and 90 g of precooked rice are placed into a 500-ml cup made of foamed styrol. A plastic intermediate lid formed with eight apertures about 3 cm in diameter is fixedly fitted in the cup, and hot water is slowly poured into the cup to a level above the lid. A top lid is then fitted over the cup. Ten seconds later, the hot water is removed from the cup, and the cup is closed again with the top lid, turned upside down and allowed to stand for 5 minutes. The top and intermediate lids are thereafter removed. A mixture of 20 g of soy sauce, 27 g of water and 7 g of the outer layer portion obtained in Example 1 is placed into the cup, and the contents are thoroughly mixed to obtain instant rice containing fermented soybeans.

EXAMPLE 8

Eight ml of soy sauce is admixed with 100 g of commercial fermented soybeans with full stirring, and the mixture is allowed to stand for 5 to 10 minutes to impregnate the fermented soybeans with the soy sauce. The mixture is thereafter subjected to vacuum freeze-drying under the same conditions as in Example 1 to obtain 45 g of dry fermented soybeans.

A 60 g quantity of warm water at 60° C. is added to the dry fermented soybeans obtained above. The mixture is allowed to stand for 5 minutes to reconstitute the soybeans. The reconstituted fermented soybeans have unique flavor and taste imparted by the soy sauce.

What we claim is:

1. A method of processing fermented soybeans comprising freeze-drying the fermented soybeans in a vacuum and separating the dried soybeans into an outer layer portion and an inner portion.

2. A method as defined in claim 1 wherein the dried soybeans are separated by a vibrating sieve.

3. A method as defined in claim 1 wherein a liquid seasoning is added in seasoning amounts to the fermented soybeans prior to the vacuum freeze-drying.

4. A method as defined in claim 3 wherein said liquid seasoning contains water and NaCl.

5. A method as defined in claim 4 wherein said liquid seasoning is added in such amount that NaCl is 0.5 to 3% and water is 3 to 20% by weight based on the fermented soybeans.

6. A method as defined in claim 3 wherein the liquid seasoning is at least one of a mixture of (1) soy sauce and sodium glutamate and (2) an aqueous solution of NaCl and sodium glutamate.

7. A salad dressing containing a sufficient amount of a powder of the outer layer prepared by the process of claim 1 so that the resulting dressing has a reduced odor of vinegar and does not separate into aqueous and oil layers over a 3 week period.

8. A cracker prepared by incorporating the inner portion prepared prepared by the process of claim 1 into a cracker making composition, the inner portion being present in the composition in flavoring amounts.

9. A method of preparing an instant fermented soybean product comprising freeze-drying fermented soybeans in a vacuum, separating the dried soybeans into an outer layer portion and an inner portion, reconstituting the separated inner portion by contacting with water and uniformly admixing a powder of the separated outer layer portion with the reconstituted portion the inner portion, outer layer portion and water are added in amounts so that, the resulting product has the original cobwebbing nature comparable to fresh fermented soybeans.

10. A method as defined in claim 9 wherein a liquid seasoning is added in seasoning amounts to the fermented soybeans prior to the vacuum freeze-drying.

11. An instant fermented soybean product obtained by the method of claim 9.

12. An instant fermented soybean product obtained by the method of claim 10.

13. A method of preparing instant rice product containing fermented soybeans comprising freeze-drying fermented soybeans in a vacuum, separating the dried soybeans into an outer portion and an inner portion, reconstituting the separated inner portion by contacting with water conjointly with precooked rice and uniformly admixing a powder of the separated outer layer portion with the resulting mixture, the inner portion, outer layer portion and water are added in amounts so that, the resulting product has the original cobwebbing nature and properties of fresh fermented soybeans.

14. A method as defined in claim 13 wherein the proportions of the precooked rice and the separated inner portion are 60 to 80 weight % and 40 to 20 weight %.

15. A method as defined in claim 13 wherein a liquid seasoning is added in seasoning amounts to the fermented soybeans prior to the vacuum freeze-drying.

16. An instant rice product obtained by the method of claim 13.

17. An instant rice product obtained by the method of claim 15.

18. A method of preparing a food product substantially having the elasticity of rice cake comprising freeze-drying in a vacuum soybeans which have been fermented by inoculating them with *Bacillus Natto*, comminuting the dried soybeans and kneading the resulting powder with water and at least one of sugars and sugar alcohols wherein the proportions of dried soybean powder, water and at least one of the sugars and sugar alcohols are 12 to 63% by weight, 9 to 47% by weight and 26 to 72% by weight respectively.

19. A method as defined in claim 18 wherein the sugars are fruit sugar, sucrose and invert sugar, and the sugar alcohols are sorbitol and xylytol.

20. A method as defined in claim 19 wherein the proportions of the dried soybean powder, water and fruit sugar are 12 to 63% by weight, 9 to 47% by weight and 26 to 72% by weight respectively.

21. A method as defined in claim 19 wherein the proportions of the dried soybean powder, water and sorbitol are 17 to 63% by weight, 10 to 47% by weight and 27 to 61% by weight respectively.

22. A method as defined in claim 19 wherein the proportions of the dried soybean powder, water and sucrose are 20 to 56% by weight, 13 to 42% by weight and 31 to 56% by weight respectively.

23. A method as defined in claim 19 wherein the proportions of the dried soybean powder, water and invert sugar are 14 to 56% by weight, 12 to 43% by weight and 32 to 63% by weight respectively.

24. A food product substantially having the elasticity of rice cake and prepared by the method of claim 18.

* * * * *

UNITED STATES PATENT AND TRADEMARK OFFICE
CERTIFICATE OF CORRECTION

PATENT NO. : 4,113,892
DATED : September 12, 1978
INVENTOR(S) : JUNICHI SHIMIZU ET AL It is certified that error appears in the above-identified patent and that said Letters Patent are hereby corrected as shown below:

Please change the assignee from "Otsuka Kagaku Yakujin Kabushiki Kaisha" to read --Mitsui Sugar Company Limited--.

Please change the word "power" in column 3, line 50, to read --powder--.

Signed and Sealed this

Ninth Day of January 1979

[SEAL]

Attest:

RUTH C. MASON
Attesting Officer

DONALD W. BANNER
Commissioner of Patents and Trademarks